United States Patent Office 3,027,338
Patented Mar. 27, 1962

3,027,338
METHOD OF PREPARING POLYESTER MOLDING COMPOSITIONS AND RESULTANT PRODUCT
Edward Chetakian, Anaheim, Calif., assignor, by mesne assignments, to Diamond Alkali Company, Cleveland, Ohio, a corporation of Delaware
No Drawing. Filed Jan. 7, 1959, Ser. No. 785,311
6 Claims. (Cl. 260—17.4)

This invention relates to polymerizable polyester molding compositions, and most particularly to the preparation of fiber-reinforced crystalline polyester premix compositions which are conveniently molded by heat and pressure to form strong plastic articles.

Polyester mixtures of a polymerizable unsaturated alkyd resin having a plurality of alpha, beta ethylenically unsaturated groups, and an unsaturated monomer are extensively employed in industry for a wide variety of purposes, such as for making laminated or molded polyester articles. A number of methods have been developed for employing these polyester resins in the preparation of molded articles. In one well known method, which is called preform molding, reinforcing fibers are preformed either with or without a binder to the exact shape of the finished part. The fibers are then impregnated with the liquid resin, and the resultant preform is molded.

In another well known method a dough-like polyester premix is prepared by intimately mixing a catalyzed polyester, while it is in the form of a somewhat viscous liquid, with the fibrous filler and other components of the composition. The resultant premix, which has a dough-like consistency, is shaped in a mold and cured by heat. This premix method has been extensively used because of its flexibility, the wide variety of articles that can be prepared, and the attractive appearance of the resultant article. The usual polyester compositions of ethylenically unsaturated alkyd resins and ethylenically unsaturated monomers which are liquid at room temperature have customarily been employed in this wet premix method.

However, even though premix molding is a widely used and much favored method, the conventional premix method has several disadvantages and limitations. Because of the heavy dough-like consistency obtained in pre-mixed compounds, it is necessary to employ relatively expensive heavy-duty dough mixers with a high horse-power input. Due to the high cost of such equipment, it is relatively difficult for a large number of small companies to make premix molding compounds. Furthermore, the strength of articles made by this premix process is limited since it is very difficult to mix substantial amounts of the strengthening reinforcing fiber, usually glass, with the premix dough. If more than 30 percent reinforcing fiber is employed, the viscosity of the composition increases markedly, and mixing of the viscous mixture causes breakage of the fiber. For many purposes it would be desirable to include 45 percent or more fiber in the mixture for greater strength. However, as the fiber content is increased above about 30 percent in this wet premix method, the high viscosity accelerates breakage of the fibers due to the mixing. As a result the strength of molded laminates prepared by the wet premix method remains essentially unchanged even though large amounts of fiber are included in the mixture.

In accordance with this invention and as a brief summary thereof, the foregoing difficulties in the conventional wet premix method are overcome by agitating granular particles of a solid crystalline catalyzed polyester composition with reinforcing fiber until a low density substantially uniform mixture is obtained. This mixture can be molded in its low density form or it can be cold compressed into a higher density dry premix molding composition. When the resultant molding composition is heated to above the melting point of the solid crystalline polyester mixture, the polyester polymerizes to provide a strong, hard cross-linked resinous article. The polyester compositions employed herein are solid crystalline mixtures of an unsaturated alkyd resin having a plurality of alpha, beta ethylenically unsaturated groups and an ethylenically unsaturated monomer.

By employing a solid crystalline polyester in the form of granules, the polyester and fibers can be tumbled in any inexpensive agitating apparatus, such as a simple rotating drum. Surprisingly, a substantially uniform mixture of polyester granules and reinforcing fibers is obtained by this method. Thus, it is not necessary to employ the relatively expensive dough mixers of the prior art for making the premix composition. In addition the reinforcing fiber content of the premix prepared by this dry method can easily be made substantially greater than the fiber content of a premix made by the well known wet process.

In greater detail, the solid polymerizable polyester compositions employed in the premix method hereof are known as crystalline polyesters. Such polyesters are more particularly defined as mixtures of an unsaturated alkyd resin having a plurality of alpha, beta ethylenically unsaturated groups with an ethylenically unsaturated monomer, which mixture has a definable melting point above room temperature. Any alkyd resin of this type which will form a solid product at room temperature upon being mixed with an ethylenically unsaturated monomer, or with a solvent such as a liquid ketone, ester or hydrocarbon, may be utilized.

Alkyd resins of the type which form crystalline polyester compositions when mixed with liquid ethylenically unsaturated monomers are well known. Generally, such alkyd resins are prepared by the reaction of ethylene glycol and fumaric acid. Also, the symmetrical diols, 1,4-butane-diol and 1,6-hexane diol may be employed in place of ethylene glycol to form an alkyd resin which provides the desired crystalline polyester.

Other polyhydric alcohols, polycarboxylic acids or acid anhydrides which contain alpha, beta ethylenic unsaturation, and even saturated polycarboxylic acids that do not impart crystallinity properties to the polyester mixture may be included in the reaction mixture to modify the properties of the alkyd resin and the resultant crystalline polyester. Such acids and acid anhydrides are both referred to herein as polycarboxylic acids. The inclusion of other polyhydric alcohols or polycarboxylic acids in the reaction mixture of an alkyd resin, such as that formed from ethylene glycol and fumaric acid, reduces the crystallinity of the resultant polyester. In other words the melting point of the crystalline polyester is reduced and it becomes more amorphous in nature. Such lower melting point polyesters are useful where it is desired to lower the temperature required for molding, since the temperature for curing must be above the melting point of the polyester. Also, they may be included in the resin to give the final premix composition a wax-like consistency and render the molding composition easy to handle. However, it is not necessary to include such additional polycarboxylic alcohols or polycarboxylic acids in preparing the alkyd resin which forms the crystalline polyester when mixed with the unsaturated monomer.

Alpha, beta unsaturated polycarboxylic acids that do not impart crystallinity to the polyester but which may be incorporated in the alkyd resin to modify the crystalline properties of the final polyester include maleic, itaconic, aconitic, citraconic and mesaconic acids, as well as the other well known acids employed for making unsaturated polyesters. An acid often employed for modifying the properties of the polyester resin is phthalic acid usually in the form of the anhydride, and small amounts of this acid may be employed. Examples of other such saturated acids that may be included in the reaction mixture for particular effects are isophthalic, adipic, azelaic, tetrachlorophthalic, sebacic, suberic, endomethylene tetrahydrophthalic and hexachloroendomethylene tetrahydrophthalic. Long chain saturated acids have a particularly strong effect in reducing crystallinity of the polyesters hereof and thus the amount of such acids, if any, must be very limited.

Typical polyhydric alcohols that do not impart crystallinity to the polyester but which may be incorporated to a limited extent in the alkyd resin which forms a crystalline polyester include diethylene glycol, propylene glycols, dipropylene glycols and non-symmetrical butylene glycols, as well as any of the polyhydric alcohols well known in the art. For some purposes, small amounts of other glycols and even unsaturated polyhydric alcohols may be employed in the reaction mixture as modifying constituents.

In preparing the alkyd resin, one or more than one combination of the foregoing polycarboxylic acids and polyhydric alcohols may be utilized. When polyhydric alcohols or polycarboxylic acids other than those which provide crystalline polyesters are included in the reaction mixture of an alkyd resin that forms a crystalline polyester composition, the effect on crystallinity varies depending upon the amount and type of such alcohol or acid. For example, small amounts of acids containing an odd number of carbon atoms have a marked effect on crystallinity, whereas even numbered acids such as oxalic, succinic and adipic have a less marked effect. Generally, not more than about 40 mol percent of the polyhydric alcohols, and not more than about 40 mol percent of the polycarboxylic acids should be of the type that form amorphous, or in other words non-crystalline, polyester compositions; and the remainder of the polyester components should be of the type that form a crystalline polyester when reacted and mixed with a monomer or a solvent. In other words the alcohol and acid which impart the crystalline properties to the polyester should each constitute at least about 60 mol percent of the alcohol and acid respectively, employed to make the alkyd resin. In any event, the amount of the non-crystalline forming alcohols and acids should not be sufficient to reduce the melting point of the crystalline polyester mixture of alkyd resin and monomer to below about 30° C. For best results, the melting point should be even higher as is explained in greater detail hereafter.

Polycarboxylic acids are reacted with the polyhydric alcohols at elevated temperatures in an inert atmosphere to prepare the alkyd resin. The reaction is usually carried out at a temperature of between 150° C. and 230° C., and the inert atmosphere may be provided by any well known inert gas, such as carbon dioxide or nitrogen. Generally, the total number of mols of alcohol exceeds the total number of mols of acid by about 5 to 20 percent in order to bring about complete esterification, although this proportion is not critical. A non-reactive solvent such as xylene, acetone or toluene is sometimes added to the reaction mixture. As the reaction proceeds, water is given off, which is removed from the system.

The reaction is continued until essentially all of the water has been removed, and the acid number is reduced to from about 5 to 70, depending upon the specific polyester being made. Upon completion of the esterification reaction, the solvent, if any, is removed and the mixture is cooled. A polymerization inhibitor is included in the alkyd resin to prevent premature polymerization and gelation.

Solid crystalline polymerizable polyesters that become cross-linked when they are polymerized are formed by intermixing ethylenically unsaturated monomers with the foregoing alpha, beta ethylenically unsaturated alkyd resins. The liquid monomer is usually added before the polyester has cooled completely in order to facilitate easy mixing. The exact temperature of the alkyd resin at which the monomer and alkyd resin are intermixed depends upon the monomer and inhibitor used. Usually a temperature in the range of 60° C. to 150° C. is employed, although lower temperatures may be used.

Unsaturated monomers included in the polyester compositions are well known and they are completely described and enumerated in the literature. Any polymerizable monomer containing one or more polymerizable $CH_2=<$ groups may be utilized. Examples of such monomers are styrene, vinyl toluene, methyl styrene, dimethyl styrene, diallyl phthalate, methyl acrylate, methyl methacrylate, vinyl acetate, divinyl benzene, and butadiene. Other special monomers may be used to obtain particular effects. For example triallyl cyanurate has been employed to give resins having high heat resistance, allyl diglycol carbonate may be used to modify the refraction of resins, and diallyl phenyl phosphonate has been employed to impart fire resistance.

The amounts of the components of the useful liquid polyester compositions may vary widely. For most purposes, approximately two parts by weight of unsaturated alkyd resin to one part by weight of unsaturated monomer is suitable for polyester compositions. However, such proportions depend upon the use intended for the polyester composition. Usually, between about 20 and 35 percent by weight monomer is employed based on the total weight of polyester and monomer. Preferably the monomer should be present in an amount that is entirely compatible with the alkyd resin to form the crystalline polyester composition. The use of an excess of monomer results in a two phase system when the resin cools if the polyester is not completely soluble in the excess monomer. In the two phase system the crystalline mixture of alkyd resin and monomer forms the solids phase and the excess monomer remains as a separate liquid phase. This excess monomer is poured off or otherwise separated from the crystalline polyester before it is pulverized by the method of this invention.

A conventional polymerization inhibitor for polyesters is added to the polyester composition either during the reaction by which the alkyd resin is formed, or during cooling of the alkyd resin after it has been prepared in order to prevent premature polymerization. If desired, the inhibitor can be mixed with the monomer and the alkyd resin can then be added to the monomer. Best inhibition is obtained by adding part of the inhibitor to the alkyd resin and part to the monomer before they are mixed. Suitable inhibitors are well known and they include dihydric phenols, hydroquinone, tertiary butyl catechol, and the soluble amine salts described in United States Letters Patent No. 2,646,416. Usually between about 0.005 percent and 2 percent by weight of inhibitor based on the weight of unsaturated alkyd resin, unsaturated monomer and inhibitor is sufficient to prevent polymerization of the polyester upon cooling and storage.

In order to provide a polyester premix that will polymerize when it is molded and heated, a catalyst for the polyester is included in the composition so that it will become a part of the premix. Most advantageously the catalyst is added while the mixture is in liquid form after it has cooled but before the crystalline polyester solidifies. The polyester should not be too warm or else the catalyst will cause premature gelation. Catalysts that have a fairly high activation temperature and which are substantially stable at room temperatures are preferred in order to provide a premix with a long shelf life. If the catalyst is unstable at room temperature, it will decompose upon storage and lose its effectiveness. Any of the well known catalysts for polyester polymerization which are not active at low temperatures may be employed. Examples of suitable catalysts include benzoyl peroxide, 2, 4-dichlorobenzoyl peroxide, lauroyl peroxide, cumene hydroperoxide, tertiary-butyl perbenzoate, di-tertiary butyl peroxide, and combinations of such catalysts. Generally, between about 0.3 percent and 5 percent by weight of catalyst is employed based on the total weight of liquid polyester in the composition.

While the polyester mixture is still liquid, it can be transferred into suitable trays for cooling. If the mixture is allowed to cool to below its melting point, when it is still in the reaction vessel, the temperature is raised to just above the melting point and the polyester is then transferred to cooling and storage trays. The resultant cooled crystalline polyester is a dry-waxy looking solid homogeneous mass.

After the mixture of alkyd resin, monomer, inhibitor, and catalyst has crystallized to form a solid, it is pulverized into granules. Any pulverizing means may be employed, such as a hammer mill. For the purposes of this invention, small granule sizes are preferred. In any event not more than 30 percent of the granules, and preferably a much lower percentage should be retained on a 10 mesh screen (U.S. Standard Sieve). If the granules are too large, the final polyester premix does not obtain the desired degree of uniformity.

During the pulverizing step, the crystalline polyester composition is maintained at a temperature substantially below the melting point of the composition, preferably at least about 10° C. below the melting point. Much lower temperatures are preferred since they render the polyester more friable and readily pulverized. Since pulverization of the solid crystalline polyester composition inherently generates an appreciable amount of heat, the polyester is cooled during pulverization. Any efficient cooling step may be employed such as the use of an ice water jacket around the pulverizer. However, it has been found that solid carbon dioxide or in other words Dry Ice is particularly advantageous as a cooling medium. Pellets of solid carbon dioxide are thrown into the polyester composition as it is being pulverized, and the temperature is safely lowered appreciably below the melting point of any crystalline polyester. Furthermore, the carbon dioxide sublimes and turns into an inert gas which does not harm or react with the polyester.

After the crystalline polyester composition has been pulverized, it is tumbled with reinforcing fibers to form the polyester premix. The fibers may vary in size from about 1/32 inch to any length desired. Shorter fibers have very little reinforcing effect. Although fibers longer than 3 inches generally tend to form a fibrous ball when they are agitated or tumbled, long fibers can effectively be used for special application with simple equipment in accordance with this process. Suitable reinforcing fibers include glass, polyester, acrylic, acetate, asbestos, and sisal.

The amount of fiber may vary considerably depending upon the strength requirements of the final cured article. Generally at least 10 percent and not more than 70 percent of the total weight of fiber and polyester granules should be composed of reinforcing fiber. In other words the polyester should constitute between about 30 and 90 percent of the weight of the fiber and the polyester granules. With less than 10 percent fiber, very little added strength is obtained in the cured article, and premix compositions that have more than 70 percent by weight reinforcing fiber form weakened cured articles because of the small amount of polyester that is present to hold the article together. The strongest articles are produced when reinforcing fibers constitute between about 30 to 60 percent by weight of the premix.

Any suitable agitating or tumbling means may be utilized to form a substantially uniform mixture of polyester composition granules and the reinforcing fibers. Most conveniently a simple rotating drum is used for this purpose. Such drums are quite inexpensive, and they readily provide a uniform premix of the solid components when they rotate for about 15 to 30 minutes. Tumbling does not usually elevate the temperature of the polyester, and thus it is not necessary to cool the mixture during this step.

After the polyester granules and the fiber have been agitated to form a low density mixture, the resultant premix composition is removed from the tumbler. The mixture may be used as a premix in its low density form. However, it is preferably cold compressed into a higher density premix molding compound having a dough-like consistency. If the premix is compressed between repellent sheets such as cellophane or polyvinyl alcohol sheets, the polyester composition will release freely from the sheets. The premix composition may be stored for substantial periods of time without premature polymerization since the crystalline polyester must be above its melting point in order to polymerize.

When it is desired to use the polyester premix for manufacturing a molded article, the premix is placed in a mold in the conventional manner, shaped by pressure, and cured by heat. Such premix compositions are useful for preparing a number of plastic articles, such as radio and television cabinets, and automotive parts including dashboards and glove compartments. Inert granular or powdery bulk fillers, such as silicates, carbonates and clays, may also be mixed with the alkyd resin when it is in liquid form either before, together with, or after addition of the monomer. Also, the bulk fillers can be intermixed by tumbling with the polyester granules. The use of such bulk fillers is well known in the art, and they provide a smoother surface in the cured article. Generally the total weight of such bulk fillers plus the fibrous fillers should not exceed about 80 percent by weight of the fillers plus the polyester composition so that the cured polyester will have a reasonable amount of strength. Similarly, coloring of the resin is often desirable for appearance and sales appeal. Dyes that are either soluble or insoluble in the polyester can be included in the same manner as bulk fillers, as is well known in the art.

The following are specific examples of the preparation of a crystalline polyester resin premix in accordance with this invention:

EXAMPLE 1

*Preparation of the Unsaturated Alkyd Resin*

An alkyd resin was prepared by mixing 0.94 mol of ethylene glycol, 0.11 mol of propylene glycol, 0.75 mol of fumaric acid, and 0.25 mol of maleic anhydride in a reaction vessel. 100 parts per million by weight of hydroquinone inhibitor was also included in the mixture. The mixture of polyhydric alcohols and polycarboxylic acid was slowly brought up to a temperature of 195° C. in a reaction vessel with constant stirring. Also carbon dioxide was introduced into the vessel to provide an inert atmosphere. The temperature was maintained between 190° C. and 200° C. for 6 hours to provide an alkyd resin having a plurality of alpha, beta ethylenically unsaturated groups. The acid number of the reaction mixture was 50.

*Formation of the Crystalline Polyester*

A crystalline polyester was formed by pouring 75 parts by weight of the light yellow glassy fluid alkyd resin, after it had cooled to 110° C., into a vessel containing 25 parts by weight of styrene into which had been mixed 500 parts per million of hydroquinone. Two tenths of a part by weight of phthalocyanine blue was also introduced into the liquid mixture to provide a blue color in the cured polyester. When the mix was allowed to cool slowly, it became solid and waxy in appearance at 36° C. This solid crystalline polyester resin was then slowly heated, and melted at about 40° C. to form a waxy stirrable fluid. One percent by weight of benzoyl peroxide catalyst was stirred into the liquid polyester mixture.

*Pulverizing the Crystalline Polyester*

While the crystalline polyester was still in liquid form, it was poured into cooling trays and permitted to cool. Next, the solid polyester was pulverized in a hammer mill. In order to maintain the temperature well below the melting point of the polyester composition, particles of Dry Ice (solid carbon dioxide) were tossed into the hammer mill during pulverization. The solid crystalline polyester was pulverized until all except about 5 percent of the granules passed through a 16 mesh screen (U.S. Standard Sieve).

*Forming the Premix Molding Composition*

25 parts by weight of 1 inch long chopped fiberglass roving (Owens-Corning No. 830) and 25 parts by weight of the same type of 2 inch chopped fiberglass roving were weighed and dumped into a circulating container. Next, 50 parts by weight of the pulverized crystalline polyester resin granules were placed over the reinforcing fibers in the circulating container. The mixture was tumbled for 25 minutes until the fibers became uniformly distributed in the low density composition. In order to form a doughy polyester premix composition, the mixture was placed between films of cellophane and compressed.

*Molding a Reinforced Polyester Article*

The doughy premix was stored at room temperature for a period of 30 days, after which it was molded at a pressure of 15 pounds per square inch between matched dies, and cured for 5 minutes at 250° F. The resultant cross-linked reinforced polyester article was a hard, strong, solid with a blue color.

EXAMPLE 2

*Preparation of the Unsaturated Alkyd Resin*

An alkyd resin was prepared by mixing 0.94 mol of ethylene glycol and 0.11 mol of propylene glycol with 1.0 mol of fumaric acid. 1000 parts per million of hydroquinone was included in the mixture as an inhibitor. The mixture was cooked at about 195° C. in the same manner as in Example 1 until the acid number of the mixture was 55. The resultant alkyd resin having a plurality of alpha, beta ethylenically unsaturated groups was allowed to cool gradually to about 115° C.

*Formation of the Crystalline Polyester*

75 parts by weight of the alkyd resin was poured into 25 parts per weight of liquid styrene to which 500 parts per million of hydroquinone had been added. Upon cooling, the material turned waxy in appearance at about 70° C. and became a solid at 60° C. Upon reheating, the melting point was found to be about 82° C. While the alkyd resin was in liquid form, 0.2 part by weight of titanium dioxide was included to provide coloring to the final polyester material. In addition, a catalyst consisting of one percent by weight benzoyl peroxide based on the weight of polyester resin components was added to the liquid mixture when it was at a temperature of about 90° C. The liquid mixture was poured into trays for cooling to form a solid crystalline polyester.

*Pulverizing the Polyester Composition*

The resin was pulverized in a hammer mill as in Example 1 using pellets of Dry Ice to maintain the resin well below its melting point. Pulverization was continued until substantially all of the granules of resin passed through a 10 mesh screen (U.S. Standard Sieve).

*Formation of the Reinforced Premix Composition*

20 parts by weight of 1½ inch chopped fiberglass, and 20 parts by weight of long fibered asbestos sold by North American Asbestos Co. were placed in a rotating container. Next 60 parts by weight of the crystalline polyester granules were dumped into the circulating container. The mixture was tumbled for a period of 20 minutes after which the fibers became uniformly distributed throughout the mixture. The resultant low density mixture was then removed from the tumbler, and compressed between sheets of polyvinyl acetate to form a dough-like premix composition.

*Molding the Polyester Premix*

The dough-like premix composition was stored for 7 days at room temperature after which it was molded in a die under 15 pounds per square inch, and cured for 5 minutes at a temperature of 250° F. to form a rigid polyester article having a white color.

EXAMPLE 3

*Preparation of the Alkyd Resin*

An alkyd resin was prepared by intermixing 0.7 mol of ethylene glycol, 0.26 mol propylene glycol, and 1 mol of fumaric acid including 1000 parts per million hydroquinone. The mixture was reacted in the same manner as in Example 1 until it had an acid number of 69.

*Formation of the Crystalline Polyester*

After the liquid alkyd resin had cooled to about 110° C., 75 parts by weight of the alkyd resin was intermixed with 25 parts by weight of styrene which contained 500 parts per million of hydroquinone as in inhibitor. Upon cooling, the mass became waxy in appearance and solid at 35° C. Before the mixture solidified 2 parts by weight tertiary butyl perbenzoate catalyst was mixed into the polyester composition, and the mixture was allowed to solidify by cooling to room temperature. When the solid crystalline polyester composition was reheated, the melting point was found to be 50° C.

*Pulverizing the Polyester Composition*

The solid cooled crystalline polyester was pulverized in a hammer mill until substantially all of the resin granules passed through a 16 mesh screen. During the pulverizing step, Dry Ice pellets were tossed into the polyester mixture to keep it solid and crystalline.

*Formation of the Reinforced Premix Composition*

70 parts by weight of the pulverized resin was introduced into a rotating drum which contained 35 parts by weight of one inch long chopped fiberglass (Owens-Corning No. 830 Roving). The mixture was tumbled for 30 minutes to provide a homogeneous distribution of the fiberglass and resin. Next, the resultant polyester premix was compressed to form a doughy premix composition, and stored for 30 days.

*Molding the Polyester Premix*

The doughy mixture was then molded in the same manner as in Example 1 to provide a solid curved polyester composition.

EXAMPLE 4

*Preparation of the Alkyd Resin*

An alkyd resin was prepared in the same manner as in Example 1 by reacting a mixture of 0.8 mol of ethylene glycol, 0.21 mol of propylene glycol and 1.0 mol of fumaric acid in which mixture 1000 parts per million of hydroquinone inhibitor had been added. The mixture was heated until it had an acid number of 60.

*Formation of the Crystalline Polyester Resin*

A crystalline polyester resin was prepared by adding 25 parts by weight of styrene containing 500 parts per million hydroquinone, to 75 parts by weight of the above alkyd resin at a temperature of 110° C., and this mixture was then allowed to cool. While it was still liquid at a temperature of 75° C., 3 parts by weight of tertiary butyl perbenzoate catalyst was thoroughly mixed with the polyester. The mixture became waxy at 65° C. and solidified at 40° C. Upon reheating the mixture, the melting point was found to be 70° C., after which it was cooled in a cooling tray.

Pulverization of the Crystalline Polyester Resin

The solidified crystalline polyester resin was pulverized in a hammer mill to form solid granules which substantially all passed through a 16 mesh screen. During pulverization pellets of Dry Ice were introduced into the hammer mill to maintain the temperature well below the melting point of the polyester resin.

Formation of the Polyester Premix 20 parts by weight of organic sisal fibers between ½ inch and 2 inches in length were introduced into a rotating drum. 80 parts by weight of the pulverized resin were then slowly introduced into the drum so that they would be tumbled with the sisal fibers. After the mixture had been tumbled for 15 minutes it became substantially uniformly mixed. The resultant low density mixture was cold compressed at room temperature between sheets of cellophane to form a doughy polyester premix composition.

Molding the Premix Composition

The premix composition was then molded between matched dies at a pressure of 15 pounds per square inch and cured for 10 minutes at 260° F. The article was removed from the dies, and it was hard and solid.

EXAMPLE 5

Preparation of the Alkyd Resin and Crystalline Polyester

When the alkyd resin prepared in accordance with Example 4 had cooled to 110° C., 75 parts by weight of the resin was poured into 25 parts by weight of allyldiglycol carbonate containing 100 parts per million of tertiary butyl catechol inhibitor. The alkyd resin and monomer were mixed, and they formed a clear light amber solution which upon cooling turned opaque at 55° C. and solidified at 50° C. On reheating, the mass melted at 75° C. While the mass was in liquid form, 40 parts by weight of the polyester resin were mixed with 60 parts by weight of inert clay filler. Also, 2 parts by weight of benzoyl peroxide catalyst were mixed into the liquid polyester composition.

Pulverization of the Crystalline Polyester Resin

After the resin had cooled and formed a solid crystalline polyester composition, it was pulverized thoroughly in a hammer mill until all of the resin passed through a 16 mesh screen and 90 percent passed through a 30 mesh screen. Dry Ice pellets were continuously thrown into the mixture during the pulverizing operation to maintain the temperature well below the melting point of the polyester composition.

Preparation of the Polyester Premix 75 parts by weight of the polyester granules were introduced into a circulating drum and tumbled with 25 parts by weight of 1 inch chopped glass fibers. After 25 minutes of tumbling the mixture was uniform. The resultant low density mixture was cold compressed between cellophane sheets to form a dough-like mixture.

Preparation of the Molded Article

The dough-like mixture was then placed into a mold and molded into shape, the resin mixture was then heated at 250° F. for 10 minutes to form a solid article.

I claim:

1. The method of preparing a fiber-reinforced polyester molding composition which comprises pulverizing into granules and in the absence of such reinforcing fiber a solid crystalline polyester mixture formed from an alkyd resin having a plurality of alpha, beta ethylenically unsaturated groups mixed with an ethylenically unsaturated monomer which is polymerizable with said alkyd resin, said alkyd resin having the property of forming a crystalline polyester when mixed with said monomer and being formed by the reaction of a symmetrical dicarboxylic acid and a symmetrical dihydric alcohol, and said solid crystalline polyester containing a polymerization inhibitor for said crystalline polyester and containing an organic peroxide polymeriztaion catalyst for said polyester; maintaining the temperature below the melting point of said crystalline polyester during pulverizing of the polyester mixture; then placing relatively long reinforcing fibers and said polyester granules in physical contact after said granules have been formed; and agitating said polyester granules with said reinforcing fibers without application of heat and without grinding to preclude substantial breakage of said fibers, until said granules and said reinforcing fibers are thoroughly intermixed.

2. The method of preparing a fiber-reinforced polyester molding composition which comprises mixing (a) a crystalline polyester formed from an alkyd resin having a plurality of alpha, beta ethylenically unsaturated groups mixed with an ethylenically unsaturated monomer which is polymerizable with said alkyl resin, said alkyl resin being prepared by the reaction of a symmetrical dicarboxylic acid and a symmetrical dihydric alcohol, and (b) a polymerization inhibitor for said crystalline polyester, with (c) an organic peroxide polymerization catalyst for said crystalline polyester to form a mixture of said (a), (b), and (c), said mixing being conducted at a temperature above the melting point of said crystalline polyester whereby said polyester is in the liquid form; cooling said mixture to a temperature below the melting point of said crystalline polyester until it becomes a solid crystalline polyester composition; pulverizing said solid polyester composition in the absence of such reinforcing fiber while maintaining the temperature of said composition below the melting point thereof to form polyester granules; then placing relatively long reinforcing fibers and said polyester granules in physical contact after said granules have been formed; and tumbling said polyester granules with said reinforcing fibers without application of heat and without grinding to preclude substantial breakage of said fibers, until said granules and said reinforcing fibers are thoroughly intermixed.

3. A fiber-reinforced polyester molding composition which comprises a substantially uniform mixture of a crystalline polyester composition in the form of discrete granules intermixed with relatively long discrete reinforcing fibers substantially at least about one-half inch in length, said crystalline polyester composition being formed from a mixture of (a) a crystalline polyester formed from an alkyd resin having a plurality of alpha, beta ethylenically unsaturated groups mixed with an ethylenically unsaturated monomer which is polymerizable with said alkyd resin, said alkyd resin being prepared by the reaction of a symmetrical dicarboxylic acid and a symmetrical dihydric alcohol, (b) a polymerization inhibitor for said crystalline polyester, and (c) an organic peroxide polymerization catalyst for said crystalline polyester.

4. The method of incorporating relatively long reinforcing fiber into a polyester composition without substantial breakage of said fiber to provide a polyester-fiber containing premix for subsequent molding under heat and pressure, which comprises pulverizing into solid granules in the absence of the fiber a solid crystalline polyester composition formed from an alkyd resin having a plurality of alpha, beta ethylenically unsaturated groups mixed with an ethylenically unsaturated monomer which is polymerizable with said alkyd resin, said alkyd resin having the property of forming a crystalline polyester when mixed with said monomer and being formed by the reaction of a symmetrical dicarboxylic acid and a symmetrical dihydric alcohol, and said solid crystalline polyester containing a polymerization inhibitor for said crystalline polyester and containing an organic peroxide polymerization catalyst for said polyester; maintaining the temperature below the melting point of said crystalline polyester during pulverizing of the polyester mixture; after said solid granules have been formed intimately mixing said relatively long reinforcing fiber with said solid granules by tumbling the same together without application of heat and grinding.

5. The method of incorporating relatively long reinforcing fiber into a polyester composition without substantial breakage of said fiber to provide a polyester-fiber containing premix for subsequent molding under heat and pressure, which comprises pulverizing into solid granules in the absence of the fiber a solid crystalline polyester mixture formed from an alkyd resin having a plurality of alpha, beta ethylenically unsaturated groups mixed with an ethylenically unsaturated monomer which is polymerizable with said alkyd resin, said alkyd resin having the property of forming a crystalline polyester when mixed with said monomer and being formed by the reaction of a symmetrical dicarboxylic acid and a symmetrical dihydric alcohol, and said solid crystalline polyester containing a polymerization inhibitor for said crystalline polyester and containing an organic peroxide polymerization catalyst for said polyester; maintaining the temperature below the melting point of said crystalline polyester during pulverizing of the polyester mixture; after said solid granules have been formed intimately mixing said relatively long reinforcing fiber with said solid granules by tumbling the same together without application of heat and grinding, the amount of fiber in said polyester-fiber containing premix being about 10 to 70% by weight of the premix, and the reinforcing fiber being at least one-half inch in length.

6. The polyester-fiber containing premix made in accordance with the method of claim 5.

References Cited in the file of this patent

UNITED STATES PATENTS

| | | |
|---|---|---|
| 2,623,029 | Dearing et al. | Dec. 23, 1952 |
| 2,624,714 | Bigelow | Jan. 6, 1953 |

OTHER REFERENCES

"Polyesters" and their applications, Reinhold and Publishing Co., N.Y., pages 108 and 116–117, copyright 1956.

UNITED STATES PATENT OFFICE
CERTIFICATE OF CORRECTION

Patent No. 3,027,338

March 27, 1962

Edward Chetakian

It is hereby certified that error appears in the above numbered patent requiring correction and that the said Letters Patent should read as corrected below.

Column 4, line 36, for "solids" read -- solid --; column 5, line 36, for "cooloing" read -- cooling --; column 10, line 22, for "alkyl", both occurrences, read -- alkyd --.

Signed and sealed this 10th day of July 1962.

(SEAL)

Attest:

ERNEST W. SWIDER
Attesting Officer

DAVID L. LADD
Commissioner of Patents